United States Patent
Burch

[15] 3,702,929
[45] Nov. 14, 1972

[54] COHERENT LIGHT ARRAY FOR USE IN IMAGE PROJECTION SYSTEMS

[72] Inventor: Jack J. Burch, Dallas, Tex.

[73] Assignee: Texas Instruments Incorporated, Dallas, Tex.

[22] Filed: July 16, 1970

[21] Appl. No.: 55,322

[52] U.S. Cl...............240/41, 240/1 R, 331/94.5 A, 353/122
[51] Int. Cl....................................................F21m
[58] Field of Search.....240/41 R, 1 R; 350/6, 7, 169, 350/171, 173; 331/94.5 A; 353/122, 102

[56] References Cited

UNITED STATES PATENTS 3,466,110  9/1969  Pole et al...............353/122 X
3,619,033  11/1971  McMahon................350/7 X Primary Examiner—Samuel S. Matthews
Assistant Examiner—Richard L. Moses
Attorney—James O. Dixon, Andrew M. Hassell, Harold Levine and Rene E. Grossman

[57] ABSTRACT

The specification discloses a coherent light array including a housing with a plurality of lenses mounted therein. A source of a coherent light beam, such as a laser, is positioned such that portions of the coherent light beam are directed through each of the lenses. The housing is rotated at a speed above the frequency response of the human eye so that pictorial noises, such as Newton Ring Patterns, are substantially reduced or eliminated when the light array is utilized in the projection of film transparencies and the like.

21 Claims, 9 Drawing Figures

COHERENT LIGHT ARRAY FOR USE IN IMAGE PROJECTION SYSTEMS

This invention relates to a source of coherent light, and more particularly to a coherent array light source which tends to eliminate pictorial noises when utilized in an image projection system.

Projection systems utilizing film transparencies are presently commonly used in both commercial and military applications. For instance, projection systems are used to illuminate and magnify film transparencies taken by military surveillance aircraft in order to enable an accurate interpretation of the data contained on the film. In such projection systems, a relatively high intensity light source is generally focused through condenser lenses upon a film transparency. The light passes through the film transparency and is projected by a projection lens upon a display surface such as a screen. In such projection systems, it is desirable to provide the highest possible resolution and contrast.

Film projection systems heretofore developed have commonly utilized incoherent light sources such as tungsten lamps or the like. In practice, however, such incoherent light sources have not generally provided the quality of image desired. It has thus been heretofore proposed that a coherent source of light, such as a laser, be utilized to project an image from a film transparency in order to increase the image quality. However, it was found that the use of coherent light sources often resulted in diffraction noises, such as Newton Ring Patterns, which tended to reduce the resolution of the projected image. In an effort to eliminate such pictorial noises, previous systems have thus been heretofore developed wherein tilted rotation glass plates or wedges were placed within expanded laser beams. Such systems have not, however, resulted in a completely satisfactory image projection light source for practical use.

In accordance with the present invention, a coherent light source is provided which may be efficiently utilized in optical projection systems and which generally eliminates coherent pictorial noise and provides improved image resolution.

In accordance with a specific aspect of the present invention, a light projection system is provided which includes a coherent array light source for directing a plurality of spherically radiating, mutually coherent light beams along a circular path. Lenses focus the light beams upon image producing structure, and the resulting image is displayed upon a display surface.

In accordance with another aspect of the invention, a plurality of light beam generating devices are space apart along the periphery of a circle. The generating devices spherically radiate a plurality of mutually coherent light beams. The light beam generating devices are rotated around the circle while maintaining the spacing therebetween.

In accordance with another aspect of the invention, a coherent light array includes a housing with a plurality of lenses mounted therein. A coherent light beam is directed through the lenses and the housing is rotated at a speed above the frequency response of the human eye.

For a more complete understanding of the present invention and for further objects and advantages thereof, reference is now made to the following description taken in conjunction with the accompanying drawings, in which.

Figure 1:
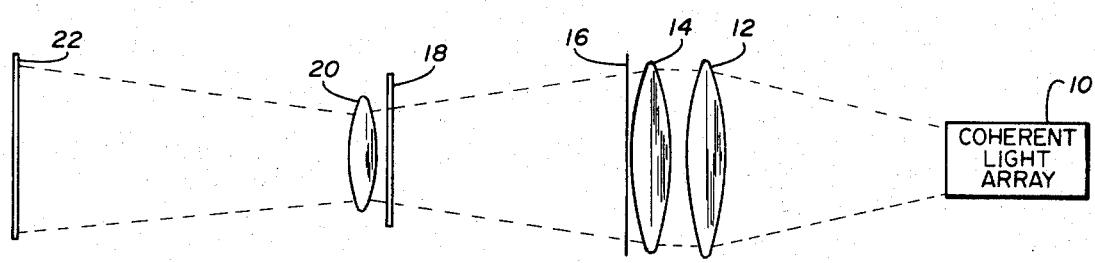
FIG. 1 is a diagrammatic illustration of a light projection system according to the invention.

Referring to FIG. 1, an optical projection system according to the invention is illustrated. A coherent light array 10, to be later described, directs a coherent light beam upon a pair of condenser lenses 12 and 14. A film transparency 16, which may comprise, for instance, a film strip mounted upon rollers for translation across the coherent light beam, is disposed in the object plane adjacent the condenser lenses 12 and 14. The coherent light transmitted through the film transparency 16 is transmitted through a spatial filter 18 and through a projection lens 20. As will be later described in greater detail, an important aspect of the invention is to direct the light emitted from the coherent light array 10 such that light converges at or near the outer periphery of the projection lens 20.

The resulting image is displayed upon a viewing surface 22 which may comprise, for instance, a screen or the like. It will be understood that in a practical embodiment of the optical projection system shown in FIG. 1, that the illustrated light beams may be bent with the use of mirrors to form a compact system for installation within a console unit. The image displayed by the present system upon the viewing surface 22 is not subject to pictorial noise such as Newton Ring Patterns or the like, and is provided with excellent resolution and image quality.

Figure 2:
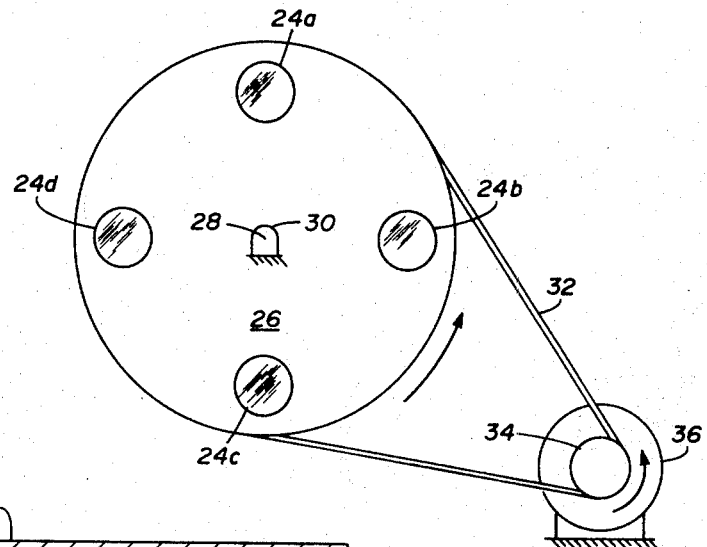
FIG. 2 is a diagrammatic illustration of a first embodiment of the present coherent light array.
Figure 3:
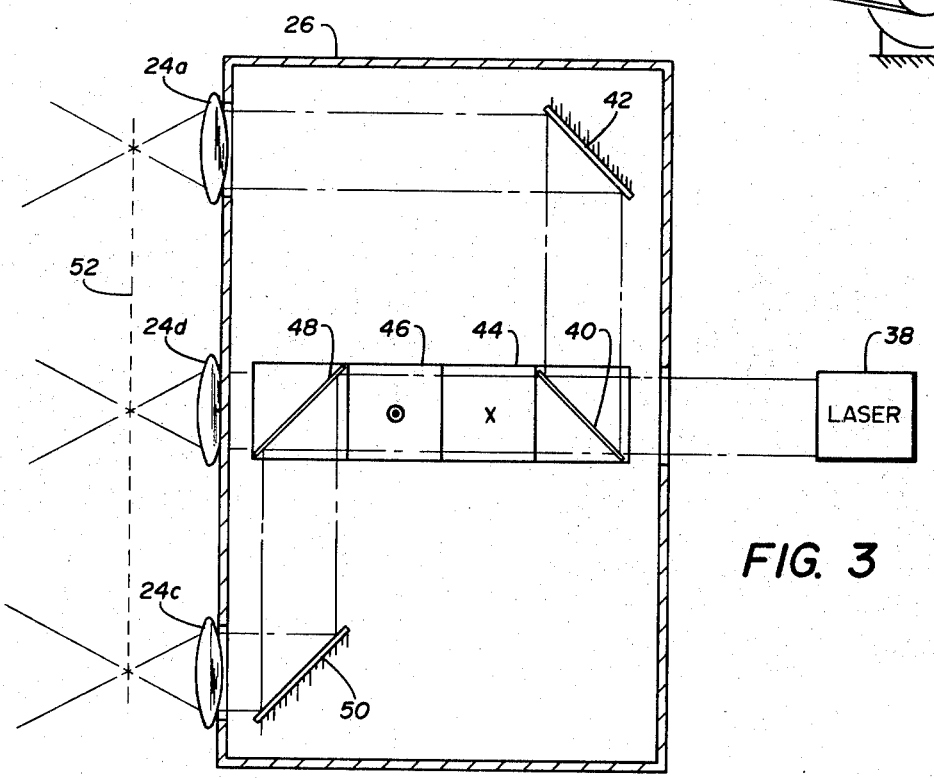
FIG. 3 is a sectional view through the system shown in FIG. 2.

FIGS. 2 and 3 illustrate one embodiment of a coherent array light source for use with the invention. Four optical lenses 24a–d are symmetrically disposed around the face of a cylindrical housing 26. Apertures are formed in the front face of the housing 26 so that light beams may be transmitted through each of the lenses 24a–d. Housing 26 is mounted for rotation about its central axis 28. In the diagrammatic embodiment illustrated, the housing 26 is journaled for rotation with respect to a fixed support member 30. A drive belt 32 extends about the housing 26 and around an output shaft 34 of a motor 36. Rotation of the motor 36 thus causes rotation of the housing 26. The optical centers of the lenses 24a–d are spaced about the periphery of a circle and upon operation of the motor 36, the lenses 24a–d are rotated about this circle. It will be understood that various other structural designs are possible for the invention, such as the use of and annular outer housing which encloses the circular housing 26, along with a shaft extending from the center of housing 26 to a motor drive belt.

Referring particularly to FIG. 3, a laser beam 38 directs a coherent light beam through an aperture in the rear of the housing 26 for impingement with a beam splitter member 40. Beam splitter member 40 is conventional, and will typically comprise an inclined semi-transparent plate which passes a portion off the coherent light beam and reflects a portion of the light beam at right angles to the transmitted light beam. As illustrated, a portion of the coherent light beam is reflected upwardly against a mirror 42, which in turn reflects the light beam through the lens 24a. A portion of the coherent light beam is transmitted through the beam splitter member 40 for impingement against a second beam splitter member 44. Beam splitter member 44 projects a portion of the coherent light beam at right angles to the line of travel of the light beam. The reflected light beam is then reflected by a mirror, not shown, and is directed through the lens 24d.

A portion of the coherent light beam from laser 38 is also reflected by a beam splitter member 46 and is reflected from a mirror, not shown, for transmission through lens 24b (not shown). The remainder of the light beam from laser 38 is reflected downwardly from a mirror 48 and is again reflected from mirror 50 for transmission through the lens 24c. Each of the lenses 24a–d spherically radiates light beams which converge to focal points in front of the housing 26 along an optical lane 52. The light beams then expand to fill the condenser lenses 12 and 14 shown in FIG. 1.

It will thus be seen that each of the lenses 24a–d spherically radiates mutually coherent light beams which are directed to fill the condenser lenses of the projection system and uniformly illuminate the object plane 16. As the housing 26 rotates, any interference patterns present in the image projected on surface 22 will tend to disappear. An important aspect of the present invention is that the housing 26 is rotated at speeds faster than the frequency response, or flicker response rate, of the human eye. Thus, the mutually coherent light beams of the invention will be rotated at least approximately 30 revolutions per second. At such speeds of revolution, interference or fringe patterns in the projected image by the present light array tend to disappear in the time average. If the light generated from the coherent light array source of the invention is focused to fall inside the projection aperture defined by the projection lens 20, excellent resolution results from the pictorial display provided by the system. An image of the coherent array light source is formed by the condenser lenses on or near the plane of the projection lenses entrance pupil. A greater proportion of diffracted light components pass through the projection lens by distributing the undiffracted light through the periphery of the projection lens. A higher degree of modulation occurs for the diffracted components causing greater contrast for the image detail.

Figure 4:
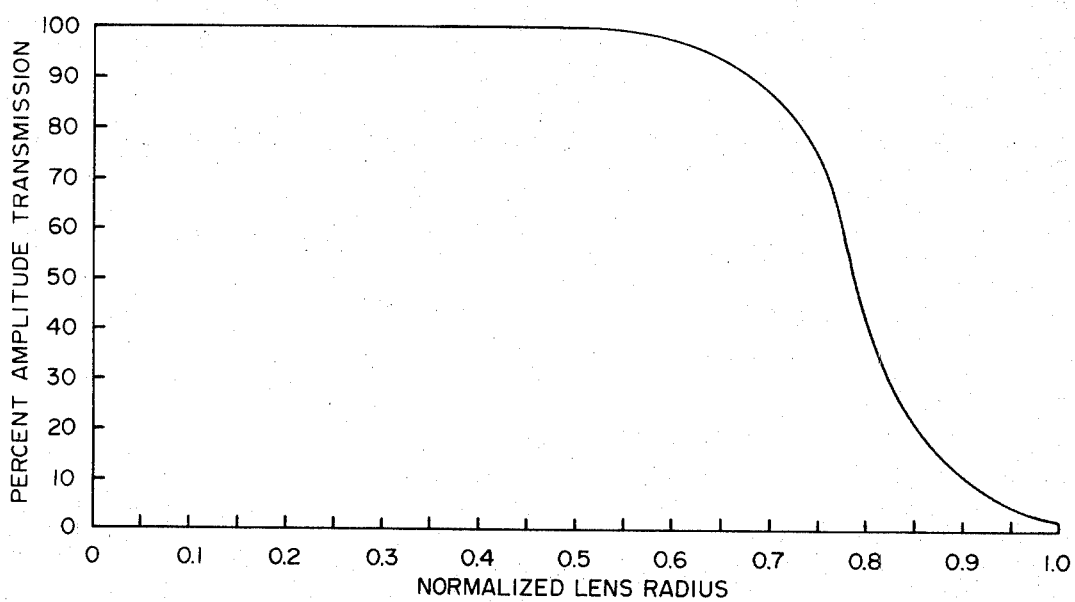
FIG. 4 is a graph illustrating the characteristics of the spatial filter shown in the system of FIG. 1.

Additionally, with the use of the spatial filter 18 shown in FIG. 1, improved operation of the invention results. FIG. 4 is a graph of the amplitude transmission of a spatial filter which has been found to work well in practice with the present invention. The undiffracted component of the spatial frequency plane is projected into the filter 18 at a distance corresponding to approximately 90 percent of the full radius of the filter. The resulting normalized amplitude response of the spatial filter illustrates that the filter 18 enhances all spatial frequencies above a predetermined value. The use of the spatial filter 18 thus enhances the modulation of the frequency range of the present system by attenuating the undiffracted light component to enhance the diffracted components.

The spatial filter 18 is preferably constructed on a transparent substrate such as a glass flat or a surface of the projection lens. A grainless coating of metal such as Nichrome or Inconel is vacuum deposited upon the glass. The coating of the metal is generally only a fraction of a wavelength in thickness and introduces essentially no phase errors or aberrations into the transmitted light. For additional information on spatial filters for use with the invention, reference is made to "Spatial Filters for Pattern Detection and Image Enhancement," *Optoelectronics*, by the present applicant, 1(1969), pages 128–133.

Figure 5:
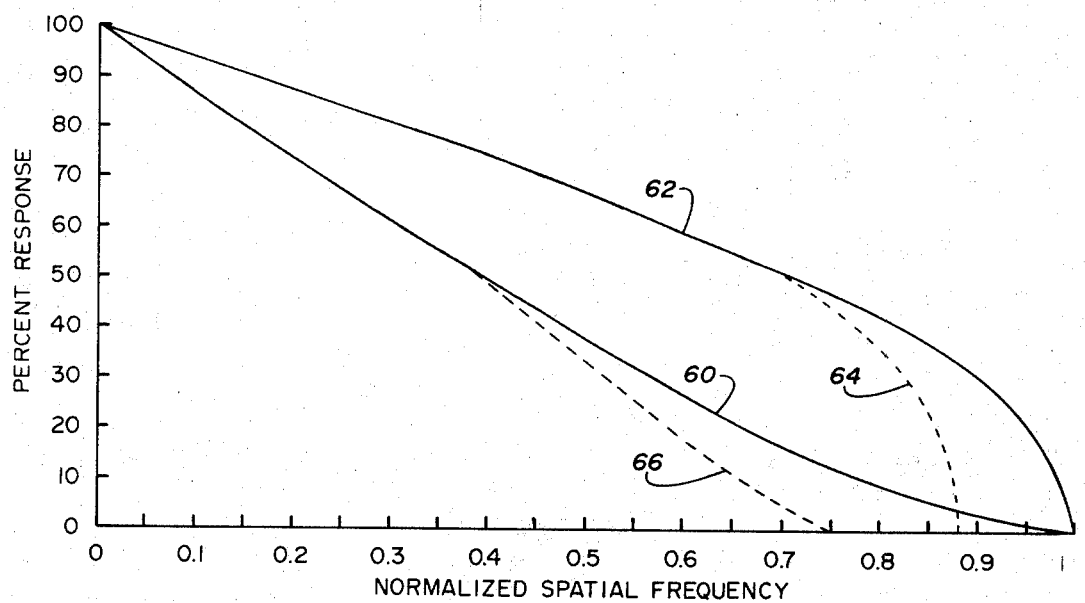
FIG. 5 is a spatial frequency response curve representative of the present coherent light array and conventional incoherent light sources.

Advantages of the present coherent array over the previously utilized incoherent arrays is illustrated in the graph shown in FIG. 5. Curve 60 is representative of the spatial frequency response of an ideal incoherent source, while curve 62 is representative of the frequency response of an idealized coherent array according to the invention. Assuming perfect lenses, the present coherent array provides a higher degree of modulation than the incoherent source. In a practical system wherein imperfect lenses are utilized, the frequency response of the present coherent array falls off as indicated by curve 64. However, the incoherent light source frequency response falls off even more radially as illustrated by curve 66. In the practical case, the present coherent light array thus provides substantially improved resolution over the incoherent source.

In an actual embodiment of the invention shown in FIGS. 1–3, a Schneider tele-zenar, 320 mm focal length lens was utilized as the projection lens 20 and the optical path length from the image plane defined by the viewing surface 22 and the object plane defined by the film transparency 16 was about 75 inches. A limiting aperture of 1.9 inches was employed in the spatial filter 18. A distance of 15 inches was used between the object plane as defined by the film transparency 16 and the projection lens 20, thereby resulting in a magnification of 4x. The two condenser lenses 12 and 14 were provided with diameters of 8 inches and focal lengths of 15 inches each. A helium neon laser emitting at 0.6328 micron was used as the basic light source for the coherent light array shown in FIGS. 2 and 3.

When the above-described embodiment was tested, it was found that substantial improvement in resolution over an incoherent light source occurred with the use of the present substantially coherent light source, without attendant pictorial noise occurrences such as Newton Rings and the like. The degree of improvement is related to the degree of coherence of the source.

It should be noted that an alternate laser particularly suited as a light source in the coherent array is the argon ion gas laser which produces strong emission lines at 4,880 A (blue) and 5,145 A (green), as well as several minor emission lines. Although the 5,145 A line may be separated and used alone in the present invention as a monochromatic light source, the 4,880 A line is always available in the same laser for use to increase the screen brightness further. There is also some evidence that the human eye perceives greater resolution with black and white film transparencies when a polychromatic source is utilized.

Figure 6:
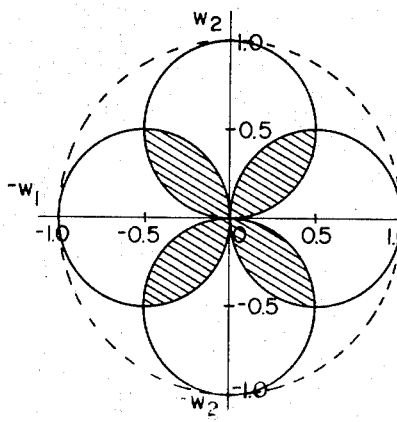
FIG. 6 illustrates the instantaneous spatial frequency response for the system shown in FIG. 2.

FIG. 6 illustrates the region of the spatial frequency plane instantaneously covered by the response of four point sources of the coherent array which are projected by the condenser lenses onto the edge of the projection lens. The quantities $\omega_1$ and $\omega_2$ denote the coordinates of the two-dimensional spatial frequency plane. The dash line indicates the "diffraction limit" or the maximum spatial frequency component which can be passed. The coordinates of the spatial frequency plane are normalized to the value of 1.0 at this diffraction limit. It may be seen from FIG. 6 that at least four point sources are generally required for the rotating coherent array of the invention in order to provide adequate coverage of the projection aperture. It will be understood that a larger number of mutually coherent beam generating lenses could be utilized in the invention to provide improved results, with theoretically the preferred embodiment comprising a complete circle of mutually coherent light beams.

The mutual coherence of the point sources of the present array provide a beneficial effect which is distinct from incoherent light point sources. This special effect may be termed as "coherent averaging" in contrast to an "incoherent averaging." The human eye and most other light detectors sense light intensity rather than light amplitude. The human eye always forms a time average of light intensities. Prior to intensity detection by human eye, the images formed by the multiple beams of the coherent light array are averaged in terms of light amplitude due to the mutual coherence of each beam. This averaging of amplitudes or "coherent averaging" does not occur when an incoherent source is used. An incoherent source results only in an averaging of light intensities. Better image quality is thus provided with the present coherent array due to the process of coherent averaging.

Figure 7:
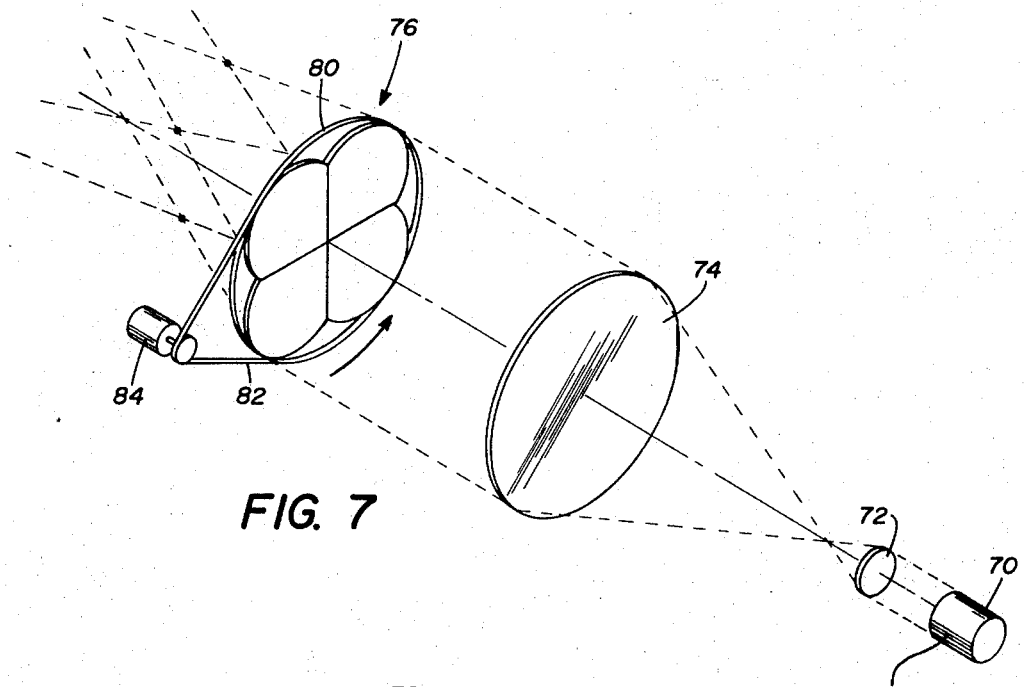
FIG. 7 is a somewhat diagrammatic perspective illustration of a second embodiment of the invention.
Figure 8:
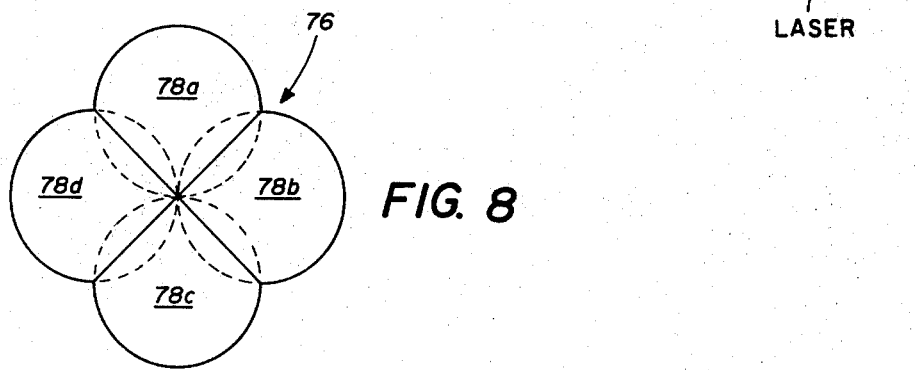
FIG. 8 illustrates detail the construction of the rotating lens utilized in the system of FIG. 7.

FIGS. 7 and 8 illustrate the preferred form of lens array for use with the present invention. This configuration provides greater optical efficiency and a more uniform illumination of the object plane. A laser 70 of the type previously described is directed through a beam expansion lens 72. The expanded coherent light beam is focused upon a collimating lens 74 which in turn directs the expanded coherent light beam upon an integral lens array 76. As best shown in FIG. 8, the lens array 76 is constructed by removing portions of four optical lenses 78a–d to form right angles on each lens. The right angle portions are then fitted together in the manner illustrated and joined by suitable adhesive or the like to form a unitary lens array. The coherent light passing through the lens array 76 is focused to form four spherically radiating, mutually coherent point sources of light which diverge to fill the condenser lenses of the projection system in the manner previously illustrated. The lens array 76 is mounted in a suitable housing 80 which may be rotated by a belt driven by a motor 84.

Although the rotating lens is illustrated schematically in FIG. 7, it will be understood that in practice the housing 80 is journaled for rotation within a stationary housing enclosing the system. The lens array 76 is rotated at a speed above the frequency response of the human eye in order to eliminate the formation of pictorial noise in the projected image of the system. As previously noted, it is important to focus the present system such that light generated by the coherent array converges near the periphery of the projection lens aperture.

Figure 9:
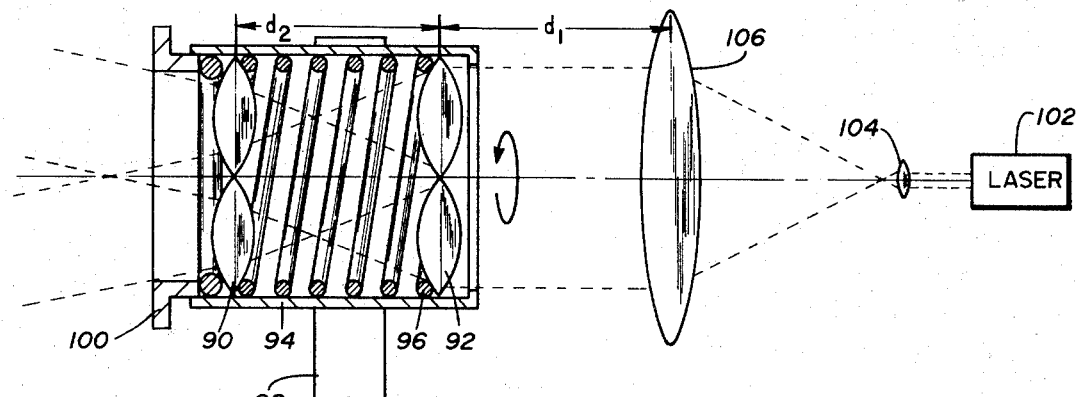
FIG. 9 is a somewhat diagrammatic illustration of a third preferred embodiment according to the invention.

FIG. 9 somewhat diagrammatically illustrates another embodiment of the invention wherein a pair of lens arrays 90 and 92 are utilized. Each of the arrays 90 and 92 is identical to the lens array illustrated in FIGS. 7 and 8. The lenses are mounted within a rotatable housing 94 and are biased apart by a spring 96. A suitable belt 98 is connected to a motor for rotation of the housing 94 in the manner previously described. A member 100 is movable with respect to the housing 94 in order to vary the spacing identified as $d_2$ between the lens arrays 90 and 92. A coherent light beam from a laser 102 is directed through a beam expander lens 104 for impingement upon a collimating lens 106.

The expanded coherent light beam is then transmitted through the rotation lens arrays 90 and 92 to form four spherically radiating, mutually coherent light beams which expand to fill the condenser lenses of the projection system. Lens array 92 focuses light at one focal length distance, while the lens array 90 is placed closer to the point focus than its focal length. Therefore, the light emerging from lens array 90 tends to diverge. This divergence angle may be varied by altering the distance $d_2$ between the lens arrays 90 and 92. Additionally, the location of the point sources of light with respect to the condenser lenses of the system may be controlled by variances in the distance $d_1$ between the lens array 92 and the collimating lens 106. The elements of the lens arrays 90 and 92 may be slightly inclined in order to depress the cone angle of the light generated thereby by about 1.5°. By selectively varying the distance $d_1$ and $d_2$, substantial variations of magnification and divergence angle $\theta$ may be obtained.

Whereas the present invention has been describe with respect to specific embodiments thereof, it will be understood that various changes and modifications will be suggested to one skilled in the art, and it is intended to encompass such changes and modifications as fall within the scope of the appended claims.

What is claimed is

1. A coherent light array comprising:
    a plurality of light beam generating means spaced apart along the periphery of a circle, said generating means spherically radiating a plurality of substantially mutually coherent light beams, and
    means for rotating said light beam generating means around said circle while maintaining the spacing therebetween.

2. The coherent light array of claim 1 and further comprising at least four light beam generating means symmetrically spaced around said circle.

3. The coherent light array of claim 1 wherein said light beam generating means are rotated at a speed above the frequency response of the human eye.

4. The coherent light array of claim 1 and further comprising:
    a source for producing a substantially coherent light beam,
    a plurality of lenses mounted in a housing,
    means for rotating said housing, and means for directing the coherent light beam emitted by said source through each of said lenses during rotation of said housing.

5. The array of claim 4 wherein said source is a laser.

6. The array of claim 4 wherein said source is an arc lamp.

7. The coherent light array of claim 4 wherein said lenses are adjacently disposed to form a unitary lens array,
lens means directing the light beam from said source upon said lens array.

8. The coherent light array of claim 7 and further comprising:
beam expansion lens means for expanding the light beam from said source, and
collimating lens means for directing the expanded light beam upon said lens array.

9. The coherent light array of claim 7 wherein said lens array comprises:
four lenses each having portions thereof removed to form a right angle, said lenses joined together at said right angles to form an integral lens array.

10. The coherent light array of claim 7 and further comprising:
a second unitary lens array mounted in said housing for receiving the light beam from said source, the distance between said lens arrays being variable for control of the divergence angle of said light array.

11. A coherent light array comprising:
a housing including a plurality of lenses mounted therein,
a source for producing a substantially coherent light beam,
means for directing portions of said coherent light beam through said lenses, and
means for rotating said housing at a speed above the frequency response of the human eye.

12. The coherent light array of claim 11 and further comprising at least four lenses mounted in said housing with the optical enters thereof being disposed along a circle, said housing being rotated about the center axis of said circle.

13. The coherent light array of claim 12 wherein said lenses are spaced equidistantly apart,
mirror means being mounted in said housing for diverting portions of said light beam through said lenses to create a plurality of coherent, spherically radiating light beams.

14. The coherent light array of claim 12 wherein each of said lenses has a right angle formed therein, said lenses being joined together at said right angles to form a unitary lens array.

15. The coherent light array of claim 14 and further comprising:
an expander lens for expanding said coherent light beam, and
means for directing the expanded light beam upon said lens array.

16. The coherent light array of claim 11 and further comprising a second plurality of lenses mounted in said housing for receiving said coherent light beam.

17. The method of generating coherent illumination comprising:
generating a plurality of spherically radiating, substantially mutually coherent light beams from points spaced around the periphery of a circle, and
rotating said light beams about the center of the circle.

18. The method of claim 17 and wherein said light beams are rotated at a speed above the frequency response of the human eye.

19. The method of claim 17 and further comprising:
spatially filtering said rotating light beams.

20. The method of claim 17 and further comprising:
focusing said light beams for convergence near the periphery of a projection plane.

21. The method of claim 17 and further comprising:
generating a coherent light beam, and
splitting said light beam into a plurality of substantially mutually coherent light beams.

* * * * *